United States Patent

[15] 3,650,702

Swets

[45] Mar. 21, 1972

[54] CRYSTAL GROWTH OF TETRAGONAL GERMANIUM DIOXIDE FROM A FLUX

[72] Inventor: Don E. Swets, Sterling Heights, Mich.

[73] Assignee: General Motors Corporation, Detroit, Mich.

[22] Filed: Apr. 15, 1970

[21] Appl. No.: 28,771

[52] U.S. Cl. .................................. 23/300, 23/301, 23/140
[51] Int. Cl. ................................. B01j 17/18, C01g 17/02
[58] Field of Search ................. 23/300, 301 SP, 302, 140

[56] References Cited

UNITED STATES PATENTS

| | | | |
|---|---|---|---|
| 2,827,361 | 3/1958 | Lebedeff et al. | 23/140 |
| 2,910,346 | 10/1959 | Manns | 23/140 |
| 3,378,350 | 4/1968 | Saski | 23/301 SP |
| 3,455,645 | 7/1969 | Kroes | 23/140 |
| 3,471,266 | 10/1969 | La Belle, Jr. | 23/301 SP |

FOREIGN PATENTS OR APPLICATIONS

| | | | |
|---|---|---|---|
| 757,736 | 9/1956 | Great Britain | 23/140 |
| 930,380 | 7/1963 | Great Britain | 23/140 |

Primary Examiner—Norman Yudkoff
Assistant Examiner—R. T. Foster
Attorney—William S. Pettigrew and R. J. Wallace

[57] ABSTRACT

Highly pure single crystals of tetragonal germanium dioxide are grown from a melt containing germanium dioxide in which germanium atoms are octahedrally coordinated to oxygen. In addition to germanium dioxide, the melt includes an oxide of a monovalent metal from Group I of the Periodic Table of the Elements. In preferred embodiments alkali metal oxides are employed, particularly sodium oxide and lithium oxide.

6 Claims, 1 Drawing Figure

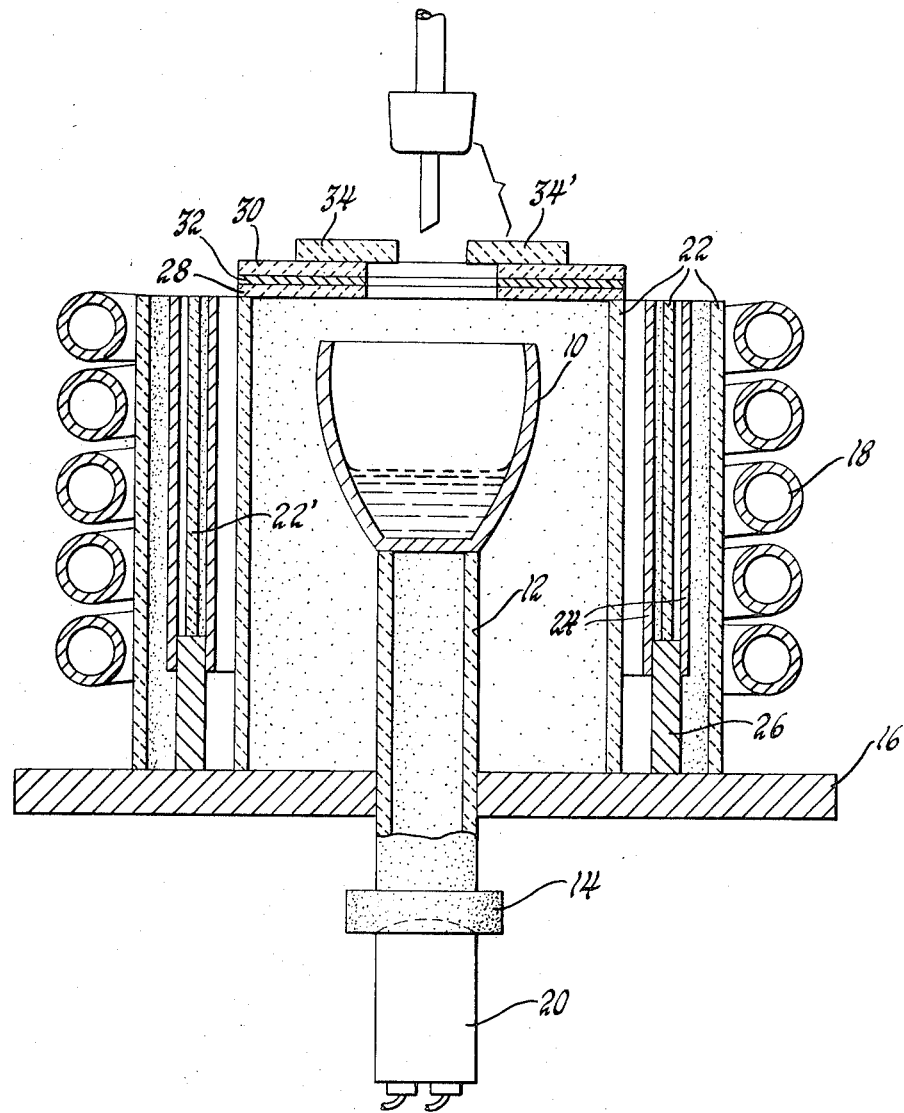

CRYSTAL GROWTH OF TETRAGONAL GERMANIUM DIOXIDE FROM A FLUX

BACKGROUND OF THE INVENTION

This invention relates to crystal growth, and more particularly to growing single crystals of tetragonal germanium dioxide.

Germanium dioxide is known to exist in two distinctly different crystalline forms, as well as in an amorphous form. The naturally occurring crystalline form is of hexagonal structure. The other crystalline form is tetragonal in structure and occurs in only trace amounts in nature. However, the naturally occuring crystalline form, the hexagonal form, is actually thermodynamically metastable under standard conditions. The other crystalline form, the tetragonal form, is the form thermodynamically stable under standard conditions.

Various techniques have been devised to produce the thermodynamically stable form of the oxide. The most successful of these are not commercially practical, and the more commercially practical approaches are not especially successful. The conventional approach for acquiring the stable form involves first forming a fine powder of hexagonal germanium dioxide, and then in the presence of a catalyst converting the hexagonal powder into tetragonal powder. The conversion processes vary but generally involve lengthy treatments at elevated temperatures and/or pressures.

Small hexagonal monocrystals have been prepared. However, attempts to directly product tetragonal monocrystals by analogous techniques have been unsuccessful. Furthermore, the hexagonal monocrystals cannot be converted into tetragonal monocrystals. Attempts to produce monocrystals of the tetragonal form by vapor phase deposition have been only partially successful at best, with results not being reproducible. Other techniques for producing monocrystals of tetragonal germanium dioxide yield only very small crystals at best. Moreover, the technique for producing the largest crystals inherently produces very impure crystals.

I have found a melt growth technique for consistently directly obtaining tetragonal germanium dioxide of an unusually high degree of purity. Not only can I consistently directly obtain this crystalline species but I can obtain it in monocrystalline form. In essence, I have found a technique by which relatively large size single crystals of tetragonal germanium dioxide of any degree impurity can be consistently and readily attained.

Large single crystals of tetragonal germanium dioxide can be used as prisms to disperse light in the near ultraviolet regions of the spectrum, as well as for frequency doublers in laser optics to get pulses of ultraviolet radiation. Tetragonal germanium dioxide is a dichroic material, and has an index of refraction of about 2.0. Such a material can provide particularly effective electro-optic light modulation of both visible and ultraviolet light. Also, it is a high energy gap material. It can be doped, as a semiconductor, to provide an ultraviolet light source by electroluminescence of a PN junction. It also has a hardness similar to corrundum, making it useful as an abrasive, particularly as a lapping compound for germanium, when suspended in a suitable vehicle. Further, I have found that larger crystals of tetragonal germanium dioxide make quite attractive artificial gem stones of various pleasing colorations. They are at least translucent and have a high index of refraction, high degree of hardness, and relative chemical inertness. Moreover, coloration can be varied by varying growth conditions and impurity content.

SUMMARY OF THE INVENTION

It is a principal object of the invention to grow single crystals of tetragonal germanium dioxide directly from a melt.

It is another object of the invention to provide a means for obtaining relatively large single crystals of tetragonal germanium dioxide.

These and other objects of the invention are attained by initially providing a germanium dioxide melt in which a substantial proportion of the germanium atoms are octahedrally coordinated to oxygen, and from which germanium dioxide will solidify on cooling. Heat is then slowly withdrawn from the melt to allow the octahedrally coordinated germanium atoms to solidify as monocrystalline tetragonal germanium dioxide, preferably onto a seed crystal, and the solidified tetragonal monocrystal thus formed is removed from the molten melt.

In my preferred process one must first pretreat a germanium dioxide melt, at least to degas it and to induce octahedral coordination of germanium atoms to oxygen, before tetragonal monocrystals can be grown. This is accomplished by introducing small amounts of an oxide of a monovalent metal from Group I of the Periodic Table of the Elements to the melt, preferably as a carbonate salt, and then heating it. For most of these metals, particularly potassium, sodium and lithium, I prefer a germanium dioxide-$M_2O$ melt having a molar ratio of about 9:1.

Octahedral coordination does not apparently immediately ensue when the mixture is melted, even if tetragonal germanium dioxide has been used to form the melt. An initial induction, or reaction, period of about 1 to 3 hours is generally required, at least to degas the melt. In any event, after this initial treatment, one can then grow tetragonal monocrystalline germanium dioxide from the melt.

BRIEF DESCRIPTION OF THE DRAWING

Other objects, features and advantages of the invention will become more apparent from the following description of preferred examples thereof and from the drawing which shows an apparatus for pulling single crystals from a melt in the manner hereinafter described.

DESCRIPTION OF THE PREFERRED EMBODIMENTS

This invention can be conveniently practiced with an apparatus such as shown in the drawing. The apparatus includes a 25-milliliter platinum crucible 10, which rests on a tubular ceramic support 12. Crucible support 12 in turn rests on a ceramic holder 14, which is disposed below furnace support table 16. Holder 14, as well as the crucible support 12, are movable to adjust the crucible in the heat field provided by the encircling induction coil 18. An infrared detector 20 beneath an aperture in tube holder 14 senses temperature of the melt in the crucible 10. Three tubular quartz elements 22 having stainless steel heat shields 24 therebetween encircle the crucible. Being positioned between the crucible and the encircling induction coil 18, they help maintain a uniform temperature in the crucible area. The central quartz element 22' and the adjacent stainless steel heat shields 24 are mounted on a metal support element 26, which rests on furnace table 16.

A composite quartz platinum heat shield, or furnace cover, rests on the upper edge of the innermost quartz tube, to minimize vertical heat loss from the crucible. The heat shield involves lower and upper quartz annular elements 28 and 30 of similar diameter, with a split platinum annulus 32 of the same diameter therebetween. The apertures in these annular elements of the heat shield are generally about two-thirds the diameter of the mouth of the crucible 10. A movable split quartz disk, having D-shaped elements 34 and 34' rests on the upper quartz element 30. The split disk is used to adjust the final size of opening on the heat shield assembly, and thereby determine melt surface temperature distribution, while leaving a viewing area for monitoring the growth process.

In order to grow a larger single crystal of tetragonal germanium dioxide one must first prepare a small seed crystal upon which the melt can solidify. The apparatus described can be successfully used to form the seed crystal, using the same melt formulation from which the large single crystal is to be obtained. The seed may be obtained by spontaneous nucleation and withdrawn from the melt in various ways. For example, crystals thus formed can be collected by freezing melt material around them onto a quartz rod or a platinum wire loop after they have grown to suitable size and then lifted out of the crucible.

A melt containing 9 moles, about 97 weight per cent, of germanium dioxide and 1 mole, about 3 weight per cent, of lithium oxide can be used to grow the seeds. A mixture consisting of 9.41 grams germanium dioxide and 0.74 gram of lithium carbonate is placed in the crucible shown in the drawing and heated to about 800° C. for 2 hours to drive off the $CO_2$ of the carbonate. It is then heated to about 1,200° C. and held for 3 hours to completely melt the mix and allow enough time for a substantial proportion of the germanium atoms to become octahedrally coordinated to oxygen.

The melt temperature is then slowly reduced, at a rate of approximately 5° C. per hour, until needlelike monocrystals of tetragonal germanium dioxide appear by spontaneous nucleation. Cooling is continued at a much slower rate, as low as 1° C. per day, until the crystals have grown to a satisfactory size for seed purposes with the equipment to be used. I prefer a needle length of about 3 to 8 mm. In any event, they are withdrawn from the melt before the melt temperature has dropped too far. Otherwise, the melt will solidify, making recovery of individual, high quality seed crystals more difficult. A cluster of the needlelike crystals can be removed from the melt by simply lifting it out with a platinum wire loop or the like. After being allowed to cool, the cluster is rinsed in hydrofluoric acid and then water to remove any melt residue that is not tetragonal germanium dioxide. A single needle is then taken from the cluster, placed in the seed holder of the crystal growing apparatus, and is ready for use in growing the larger monocrystal.

An alternate way of initiating growth to obtain seeds is to lower a platinum wire into a melt held at about 1,075° C. The cooling effect of the wire will cause nucleation of needle-shaped crystals which grow outward from the point where the wire touches the melt. Growth is mainly near the melt surface.

A new 9:1 molar mixture of germanium dioxide and lithium oxide, respectively, is preferably then prepared in the same manner as before in order to grow a moderate size crystal boule. The germanium dioxide-lithium carbonate mixture is heated at 800°-1,000° C. until $CO_2$ evolution stops. The mixture is then raised to about 1,200° C. for several hours and then slowly cooled to about 1,075° C. The seed can now be lowered into contact with the melt. While one may simply use the same melt from which the seed crystal was grown, I prefer to use a freshly prepared melt. Melt effectiveness appears to deteriorate with time, and I have had best results by discarding the seed melt and using a fresh melt to grow the monocrystal.

In any event, once the melt is stabilized at approximately 1,075° C. the seed can be lowered into contact with it to commence growth of the crystal boule. Heat is withdrawn from the melt through the seed, and tetragonal germanium dioxide solidifies onto the seed at the seed-melt contact interface. Concurrently, the seed is progressively withdrawn from the melt at a commensurate rate. I prefer to pull the crystal at a rate of about 1 mm. per day. Slower growth rates are impractical and substantially larger rates appear to produce significant imperfections in the crystal. However, it is to be understood that further refinements in the process and equipment used would probably permit faster growth rates. The rate of growth, of course, is dependent on the rate of solidification onto the seed which, in turn, depends on the rate at which the heat of fusion is withdrawn from the melt through the seed and the rate at which octahedrally coordinated Ge-O groups can reach the freezing interface by diffusion.

Spontaneous nucleation is undesirable in this step of the process. Hence, I prefer to grow the monocrystal at an effectively constant melt temperature. I prefer a temperature of about 1,075° C. However, one can use any temperature-composition combination along the liquidus line between the melting point of pure germanium dioxide, and approximately 1,025° C., the melting point temperature of the eutectic of $GeO_2$ and the monovalent metal germanate compound having the lowest identifiable monovalent metal oxide content. This germanate is a complex oxide empirically identified as $Li_2O \cdot 7 GeO_2$. Below this eutectic temperature pure germanium dioxide crystals cannot be obtained, since the complex oxide will also solidify.

All of the temperature measurements recorded in the work reported herein were taken with an optical pyrometer. Reports of eutectic points and the like, of course, are taken from the known published data on germanium oxide-monovalent metal oxide phase diagrams.

When using a melt having a mass that is relatively large compared to the crystal to be grown, the melt temperature can be maintained almost constant. If the temperature is lowered too rapidly one runs the risk of nucleating additional $GeO_2$ crystals or $Li_2O \cdot 7GeO_2$ crystals, deleteriously affecting the monocrystal being grown.

The crystals thus obtained are at least translucent and many are clear. Coloration varies from colorless through various shades of pink to deep red. Coloration appears to be principally imparted by the presence of selected impurities, particularly ferrous ions, in the melt and can be adjusted to some extent by growth rate.

As previously indicated, lithium oxide is not the only oxide which can be used in this invention. I have found that other oxides exhibit relevant characteristics similar to lithium oxide and can be used to make up the octahedrally coordinated melt. Sodium oxide has provided particularly satisfactory results. In fact, the monovalent oxides of copper and silver can be used, but particularly those of the alkali metals. Small amounts of all these oxides appear to induce octahedral coordination of germanium atoms to oxygen in the molten oxide, analogous to that described for lithium oxide, from which tetragonal germanium dioxide can be solidified.

As the specific example indicates, one can form the melt with the catalyst oxide itself, or with a compound which will produce it in the melt. For example, the lithium carbonate decomposes to lithium oxide and $CO_2$, with the latter evaporating. A lithium germanate can be used as a catalyst source also, and even as the principal source of germanium dioxide. Moreover, germanium dioxide in any crystalline or amorphous form can be employed. It should also be appreciated that while I characterize the melt as containing germanium dioxide and the oxide of a monovalent metal, the melt composition, after pretreatment, may in fact be a reaction product of the two. Thus, a variety of routes are available by which one can provide the germanium dioxide melt in which germanium atoms are octahedrally coordinated to oxygen.

Also, as previously indicated, the monovalent metal oxide content in the melt that can be used is generally about 10 mole per cent. However, as one might expect, optimum concentrations will vary to some extent for each monovalent metal oxide used. In any event, the monovalent metal oxide content should not be appreciably greater than that stoichiometrically necessary to form the eutectic mixture of $GeO_2$ and the monovalent metal germanate with the lowest identifiable metal oxide content. Generally, this eutectic mixture occurs at a molar ratio of about 1:9. On the other hand, there must be sufficient metal oxide present to induce a reasonable degree of octahedral coordination in the melt. At least about 5 mole per cent appears to be needed for a practical rate of growth with lithium and sodium oxide catalysts, and preferably at least 7 mole per cent. The maximum proportion of these particular oxides that can be used is about 10.5 mole per cent (96.8 weight per cent), or lithium germanate solidifies.

It should also be pointed out that the metal becomes increasingly more concentrated in monovalent metal oxide as the germanium dioxide solidifies. This appears to be a significant consideration only when growing relatively large crystals from comparatively small melt volumes. Also it appears that some of the monovalent metal oxide vaporizes, or is otherwise lost, during the growth process, tending to offset the decrease in germanium dioxide content. With relatively large melt volumes these effects are not particularly noticeable, except perhaps over unduly extended growth periods.

It is to be understood that although this invention has been described in connection with certain specific examples thereof no limitation is intended thereby except as defined in the appended claims.

I claim:

1. The process of growing tetragonal germanium dioxide crystals directly from a melt comprising the steps of:

providing a completely molten melt containing germanium dioxide and an oxide monovalent metal from Group I of the Periodic Table of the Elements in which germanium atoms are octahedrally coordinated to oxygen and from which germanium dioxide can be solidified on cooling;

said melt being above the melting point temperature of the eutectic between germanium dioxide and the monovalent metal germanate having the lowest identifiable monovalent metal oxide content;

slowly cooling at least a portion of the melt to a temperature at which said melt portion is saturated with germanium dioxide to solidify crystalline tetragonal germanium dioxide therefrom; and withdrawing the solidified crystalline tetragonal germanium dioxide from the melt portion before it cools to a temperature below the melting point temperature of said eutectic.

2. The process as defined in claim 1 wherein the melt empirically consists essentially of germanium dioxide and the oxide of an alkali metal and the germanium oxide content is at least about 89.5 mole per cent.

3. The process of growing monocrystals of tetragonal germanium dioxide from a melt comprising the steps of:

providing a melt composition empirically consisting essentially of germanium dioxide and an oxide of a monovalent metal from Group I of the Periodic Table of the Elements, the proportion of monovalent metal oxide being stoichiometrically less than the eutectic composition between germanium dioxide and the monovalent metal germanate with the lowest identifiable monovalent metal oxide content;

heating the composition to a temperature above the melting point temperature of said eutectic and at which it is completely molten to provide a melt in which germanium atoms are octahedrally coordinated to oxygen and from which tetragonal germanium dioxide crystals can be grown;

contacting said melt with a seed crystal of tetragonal germanium dioxide to form a seed-melt contact interface;

establishing a freezing isotherm for germanium dioxide at said interface;

withdrawing heat from said melt through said seed to induce monocrystalline solidification of tetragonal germanium dioxide onto said seed at said interface; and progressively withdrawing said seed from said melt at a rate commensurate with said monocrystalline solidification of tetragonal germanium dioxide.

4. The process as defined in claim 3 wherein the monovalent metal is an alkali metal and the alkali metal oxide content is about 5 to 89.5 mole per cent.

5. The process as defined in claim 4 wherein the alkali metal oxide is at least one selected from the group consisting of cesium oxide, lithium oxide, potassium oxide, and sodium oxide.

6. The process as defined in claim 5 wherein the monovalent metal oxide is lithium oxide, the lithium oxide content is about 89–93 mole per cent, the lithium oxide is provided in the melt by in situ thermal decomposition of lithium carbonate, and the melt is heated for at least 1 hour in a completely molten condition before commencing crystal growth, to assure octahedral coordination of germanium atoms to oxygen in the melt.

* * * * *